Feb. 23, 1971     C. F. GARCIA ET AL     3,565,533

CEMENT ADDITIVE DETERMINATION

Filed April 14, 1969

INVENTORS.
CALIXTO F. GARCIA
JAMES E. RITTER
BY John O. Evans, Jr.

ATTORNEY

United States Patent Office 3,565,533
Patented Feb. 23, 1971

3,565,533
CEMENT ADDITIVE DETERMINATION
Calixto F. Garcia, Hurst, Tex., and James E. Ritter, Lafayette, La., assignors to Byron Jackson Inc., Long Beach, Calif., a corporation of Delaware
Filed Apr. 14, 1969, Ser. No. 815,763
Int. Cl. G01j 3/46; G01n 33/38; B01j 7/12
U.S. Cl. 356—173                            11 Claims

ABSTRACT OF THE DISCLOSURE

A method for determining the distribution of an additive in the dry ingredients of an oil well cementing composition wherein a tracer dye is blended with the additive and the additive is blended with the remainder of the cement composition, a test sample of the total mix being then mixed with a liquid to dissolve the dye and a spectrophotometric analysis is made to determine the percentage of the dye and thus the additive in the cement mix.

BACKGROUND OF THE INVENTION

In the cementing of wells, such as oil and gas wells, such as, for example, in the cementing of a string of well casing within the well bore, various conditions exist which require the inclusion of additives in the cement composition, the additives modifying the characteristics of the cement composition so as to adapt the cement to the well conditions or to the pumping conditions. For example, it may be desired to retard the setting time of the pumpable cement slurry so that the cement slurry does not commence to set up before the completion of the displacement of the cement into the well bore, or into earth formations in the case of squeeze cementing of the latter. In other instances it may be desired that the setting time of the cement slurry be accelerated, as a consequence of which other additives are employed.

In addition, it may be desirable to induce turbulence in the stream of cement slurry as it is being pumped downwardly through the well casing and upwardly through the annulus so as to reduce the friction effects. Still further, in the cementing of some wells fluid loss additives must be employed in the cement slurry to prevent the loss of the liquid phase of the cement slurry into porous earth formations. As still another example, dispersants may be employed in the cement mix. All of the foregoing is well known in the art of oil well cementing, and examples of the various additives are numerous, it being well known to use certain of such additives either singly or in combination with other of the additives where well conditions require the use of plural additives.

One of the problems encountered in the blending or mixing of the dry cement ingredients at locations remote from the well site is the need for a determination that the additives have been properly distributed throughout the entire quantity of cement, which is shipped to the well site and there mixed with water and displaced into the well bore. The usual tests employed to determine the characteristics of an oil well cement involve actually mixing test quantities of the dry cement ingredients with water and subjecting the test mix to tests including setting time tests, all of which tests are time-consuming and expensive. The foregoing gives rise to the need for a simple yet efficient method for determining the distribution of additives in oil well cementing compositions.

SUMMARY

The present invention provides a simple, inexpensive and efficient method for determining the distribution of additive materials in the dry ingredients of a cement mixture.

More particularly, the present invention provides a method for determining the distribution of an additive in the dry ingredients of a cement mixture wherein the additive itself is first pre-mixed or blend with a dye, thereafter the additive being blended with the other cement ingredients. Following thorough mixing of the entire mix, sample quantities may be mixed with an agent whereby to dissolve the dye material whereby to provide a colored fluid, the color of which is indicative of the distribution of the dye in the cement mix and, consequently, assuming the dye and additive to have been thoroughly mixed, indicative of the distribution of the selected additive within the dry ingredients of the cement composition. The spectrophotometric or colorimetric analysis of the colored liquid provides a means for comparison with a standard; thus a check of the distribution of the additive may be readily and efficiently accomplished at any location, such as at a storage center at which the dry ingredients are initially blended, or at a well site, so as to be certain that the additives are properly distributed throughout the entire mix of the cement ingredients prior to mixing the same with a liquid vehicle and displacement of cement into the well bore.

Such a method has the advantage in that it provides a facility enabling the oil well cementing technicians to ascertain beforehand that the cementing composition is properly mixed, thereby preventing potential costly errors in the cementing operation such as may be caused by the lack of suitable quantities of the various additives in certain portions of the cement and/or excess amounts of the various additives in other portions of the cement slurry.

DESCRIPTION OF THE PREFERRED EMBODIMENTS

Figure 1:
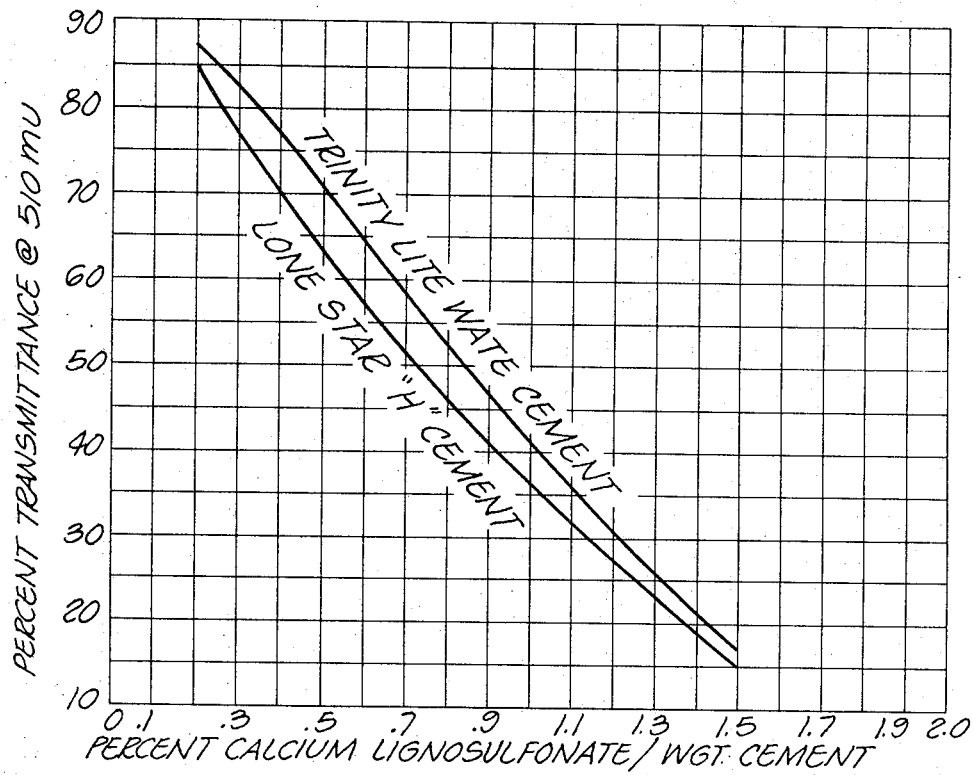
FIG. 1 is a chart showing a light transmittance reference curve for use in determining the presence of one dye substance.

Hereinafter, specific examples are given respecting the determination of the distribution of a cement retarder in the dry ingredients of a cement mix, such retarders being calcium lignosulfonate, on the one hand, and so-called silica flour and tartaric acid, on the other hand, the former (calcium lignosulfonate) being mixed with a water soluble dye and the latter being mixed with a dye which is insoluble in water but which is soluble in an organic solvent, preferably one of the aromatic solvents derived from benzene. However, it is to be understood that the specific disclosure should not be taken in a limited sense in that other dyes may be employed and mixed with other additives, the distribution of which may be determined in the same fashion employing the same method as hereinafter will be more particularly described. Illustrations of the state of the art of additives for cement compositions are an accelerator, such as spodumene as disclosed in U.S. Pat. No. 3,331,695; a turbulence inducer or friction reducer, such as a polyvinylpyrrolidone reacted with sodium napthalene sulfonate and formaldehyde as disclosed in U.S. Pat. No. 3,359,225; a dispersant, such as a metal lignosulfonate as disclosed in U.S. Pat. No. 3,126,291; a fluid loss additive, such as carboxy methyl hydroxy ethyl cellulose as disclosed in U.S. Pat. No. 2,909,223; or such as other retarders, including the carboxymethyl hydroxyethyl cellulose as disclosed in U.S. Pat. No. 3,245,814, or the acid carboxyalkyl oxycellulose as disclosed in U.S. Pat. No. 2,874,778.

In accordance with the present invention, the following is an example of the use of a selected water soluble dye in a setting time retarder for a cement composition, the retarder being calcium lignosulfonate and the dye being a fluorescein disodium salt mixed in the proportions of 0.20 lb. of the dye per 1000 lbs. of the retarder.

As a specific example, 1500 lbs. of calcium lignosulfonate and 0.4500 lb. or 204.03 grams of fluorescein dye were dry blended together in a ribbon blender. The calcium lignosulfonate was loaded in the blender and the dye distributed over the top of the retarder. These ingredients were then mixed for a sufficient period of time that the distribution of the dye in the retarder should be complete.

To determine the dye distribution following mixing with the retarder, four samples, 8 ounces each, were taken from the top of the blender at timed intervals while the blending continued and such samples were labeled 1 through 4.

Thereafter, the following dye distribution test procedure was followed in respect of the four samples:

(A) Weigh 1.75 grams of the mixed retarder and dye from each sample into 32 ounce sample bottles.
(B) Add 350 grams of Lone Star H cement to each, and mix thoroughly.
(C) Add 350 cc. of distilled water and mix for 35 seconds at high speed using a Waring Blendor.
(D) Filter, using #40 filter paper, into test tubes to be used in a spectrometer.
(E) Read percent light transmittance at 510 mu wavelength and determine retarder concentration from the appropriate curve of FIG. 1, depending upon the particular cement.

The following table shows the results of the test procedure:

RESULTS OF BLEND CHECK

| Sample No. | 510 mu readings | Percent retarder-dye/wgt. cement |
|---|---|---|
| 1 | 63 | 0.51 |
| 2 | 64.5 | 0.49 |
| 3 | 64 | 0.50 |
| 4 | 65 | 0.48 |

The desired dye distribution was 0.50% and maximum deviation was ±.02%.

A field test was then conducted at a field cement blending station to check the efficiency of the method and the blending equipment. The equipment employed at the field station comprised a pair of adjacent 250 cu. ft. air blenders with a 21 cu. ft. pneumatic proportioner connected to the feed lines to the blenders. The sample cement mix was to comprise 9400 lbs. Trinity Lite Wate cement, plus 79.9 lbs. (.85% by weight of cement) of the calcium lignosulfonate-fluorescein dye mixture which had been previously blended as described above.

The procedure for blending the additive and the cement was to load the proportioner with 80 lbs. of the additive and the proportioner pressure to 35 p.s.i. The blender was loaded with the cement from a silo proportionately as the additive weight in the proportioner decreased. The mix was then blended for 5 minutes by 35 p.s.i. air surges, and the entire mix was then transferred to another blender. Four samples were taken from the stream of cement-additive mix during such transfer.

Following the previous test procedures, these samples were then mixed with water, filtered, spectrophotometrically analyzed, and compared to the curve of FIG. 1, with the following results:

ANALYSIS OF ADDITIVE-CEMENT BLEND

| Sample No. | Lbs. left in blender when sample taken | 510 mu readings | Percent additive-dye by wgt. cement |
|---|---|---|---|
| 1 | 7,000 | 49 | .85 |
| 2 | 5,000 | 48.5 | .86 |
| 3 | 3,000 | 51 | .83 |
| 4 | 1,000 | 49 | .85 |

Maximum variation in blending uniformity was within ±.02% of desired retarder concentration.

Also in accordance with the present invention, the following is a further example of the use of another dye, in this case one soluble in oil, in another setting time retarder. More particularly, the retarder is typically composed of a 1:1 weight ratio of −200 +325 mesh ground sand or silica flour and tartaric acid, as is well known in the well cementing art, and the dye is an oil red dye, ortho toluidine (2–5 xylidine) 2 naphthol.

As a specific example, 1000 lbs. of silica flour and 1000 lbs. of powdered tartaric acid were mixed with 0.8000 lb. or 362.7 grams of the red dye. The additive, or silica flour-tartaric acid, was loaded into a blender by adding 100 lbs. of each component, alternately. The dye was sprinkled on top of the mix in the blender. These ingredients were then mixed for a sufficient period of time that the distribution of the dye in the retarder should be complete.

To determine the dye distribution following mixing with the retarder, four samples, 8 ounces each, were taken from the top of the blender at timed intervals while the blending continued and such samples were labeled 1 through 4.

Thereafter, the following dye distribution test procedure was followed in respect of the four samples:

(A) Weigh 1.000 gr. from each sample into 8 oz. bottles.
(B) Add 100.0 gr. of cement to each, cover with a lid and mix thoroughly.
(C) Add 150 cc. of xylene and mix for 30 sec. with an electric propeller type stirrer.
(D) Filter the slurry using #40 filter paper, and collect the red filtrate in test tubes to be used in a spectrometer.
(E) Read percent light transmittance at 500 mµ wavelength and determine retarder concentration from curve of FIG. 2.

The following table shows the results of the test procedure:

| Sample No. | 500 mu readings | Percent retarder/ weight cement |
|---|---|---|
| 1 | 65.5 | 1.00 |
| 2 | 65.0 | 1.01 |
| 3 | 66.0 | .98 |
| 4 | 65.0 | 1.01 |

A field test was then conducted at a field cement blending station to check the efficiency of the method and the blending equipment. The equipment employed at the field station included an air-screw blender with a 10″ screw and with an admix screw feed connected to a loading elevator. The sample cement mix was to comprise 14,000 lbs. of Trinity Class A cement, plus 70 lbs. (.5% by weight of cement) of the 1:1 silica flour-powdered tartaric acid additive.

The procedure for blending the additive and the cement was to load the additive into the admix screw throughout loading of the cement into the blender. The dry ingredients were then blended for 10 minutes utilizing air surges and screw rotation at 60 r.p.m. The mix was transferred to a bulk truck. During such transfer, four samples were taken from the stream of cement-additive mix.

Figure 2:
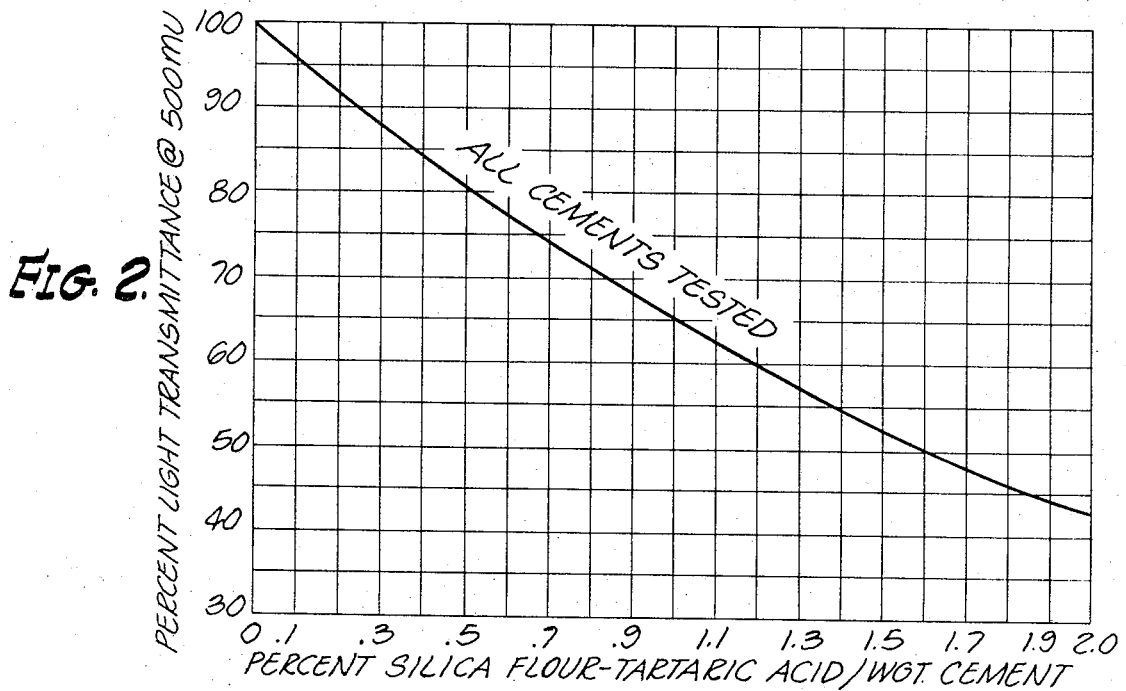
FIG. 2 is a chart showing a light transmittance reference curve for use in determining the presence of another dye substance.

Following the previous test procedures these samples were then mixed with the solvent xylene, filtered, spectrophotometrically analysed, and compared to the curve of FIG. 2 with the following results:

| Sample No. | Lbs. left in blender when sample taken | 500 mu reading | Percent additive by wgt. cement |
|---|---|---|---|
| 1 | 12,000 | 80.0 | .51 |
| 2 | 9,000 | 80.5 | .50 |
| 3 | 6,000 | 81.0 | .49 |
| 4 | 2,000 | 80.5 | .50 |

Substantially total recovery of the additive-dye was accomplished and the variation in blending uniformity was within + or −.01% of the intended or usual concentration of the retarder.

It will be appreciated that under some circumstances, it may be desirable to employ a plurality of additives, such as a retarder and a fluid loss additive, for example, or under some circumstances both of the retarders previously described. Under such circumstances, the water soluble dye, which is insoluble in oil, may be employed in the other additive. The two additives may then be blended with the cement and samples taken and tested as described above.

We claim:

1. The method of determining the distribution of an additive in a well cementing composition comprising: mixing a soluble dye substance with the additive; blending the mixed dye substance and the desired percentage of the additive with the dry cement; taking a sample of the blended cement, dye substance and additive; mixing the sample with a liquid to dissolve the dye substance and produce a colored liquid; and colormetrically measuring the concentration of the dye substance in the colored liquid as an indication of the percentage of the additive in the sample.

2. The method of claim 1, wherein said dye substance is water soluble and insoluble in oil, and said sample is mixed with water.

3. The method of claim 1, wherein said dye substance is oil soluble and insoluble in water, and said sample is mixed with oil.

4. The method of claim 1, wherein said dye substance is a fluorescein disodium salt, and said sample is mixed with water to dissolve said dye substance.

5. The method of claim 4, wherein said additive is a setting time retarder consisting of calcium lignosulfonate.

6. The method of claim 1, wherein said dye substance is ortho toluidine (2-5 xylidine) 2 naphthol, and said sample is mixed with an oil to dissolve said dye substance.

7. The method of claim 6, wherein said additive is a setting time retarder consisting of silica flour and powdered tartaric acid in the proportion of about 1:1.

8. The method of determining the distribution of two additives in a well cementing composition comprising: mixing a first dye substance with one of said additives; said first dye substance being soluble in water and insoluble in oil; mixing a second dye substance with the other of said additives; said second dye substance being soluble in oil and insoluble in water; blending the mixed dye substances and additives with the dry cement; taking at least two samples of the blended cement, dye substances and additives; mixing one of said samples with water to dissolve the first dye substance and produce a colored liquid; mixing the other of said samples with oil to dissolve said second dye substance and form a colored liquid; and colorimetrically measuring the concentration of the respective dye substances in the colored liquid as an indication of the percentage of the respective additives in the samples.

9. The method of claim 8, wherein said first dye substance is fluorescein disodium salt, and said second dye substance is ortho toluidine (2-5 xylidine) 2 naphthol.

10. The method of claim 8, wherein said first dye substance is fluorescein disodium salt, and said second dye substance is ortho toluidine (2-5 xylidine) 2 naphthol, and said additives are calcium lignosulfonate and a combination of silica flour and powdered tartaric acid.

11. The method of claim 8, wherein said first dye substance is fluorescein disodium salt, and said second dye substance is ortho toluidine (2-5 xylidine) 2 naphthol, and said additives are calcium lignosulfonate mixed with said first dye substance and a combination of silica flour and powdered tartaric acid mixed with said second dye substance.

References Cited

UNITED STATES PATENTS

| 2,195,798 | 4/1940 | Jones et al. | 23—230 |
| 2,562,902 | 8/1951 | Fischer | 73—432 |
| 3,186,853 | 6/1965 | Meusel | 99—159 |
| 3,499,328 | 3/1970 | Kennet et al. | 73—432 |

FOREIGN PATENTS

| 214,199 | 6/1968 | U.S.S.R. | 356—73 |

OTHER REFERENCES

Angeletti et al. "Colorimetric Determination of the Lignosulfonates Present in Additives for Cement," in Chem. Abstr., vol. 60, #233b (1960).

Wexler et al. "Use of UV Spectrophotometry in Determining Lignosulfonate Additions in Cement," Materials Research Standards, vol 3, #5, May 1963, pp. 364–8.

RONALD L. WIBERT, Primary Examiner

R. J. WEBSTER, Assistant Examiner

U.S. Cl. X.R.

106—314, 90; 252—406; 356—256; 250—71; 73—432, 151, 61; 23—230; 166—293